Aug. 30, 1932.  W. C. KLEIN  1,874,761
RAILWAY CAR TRUCK ASSEMBLY
Filed Jan. 14, 1931   2 Sheets-Sheet 1
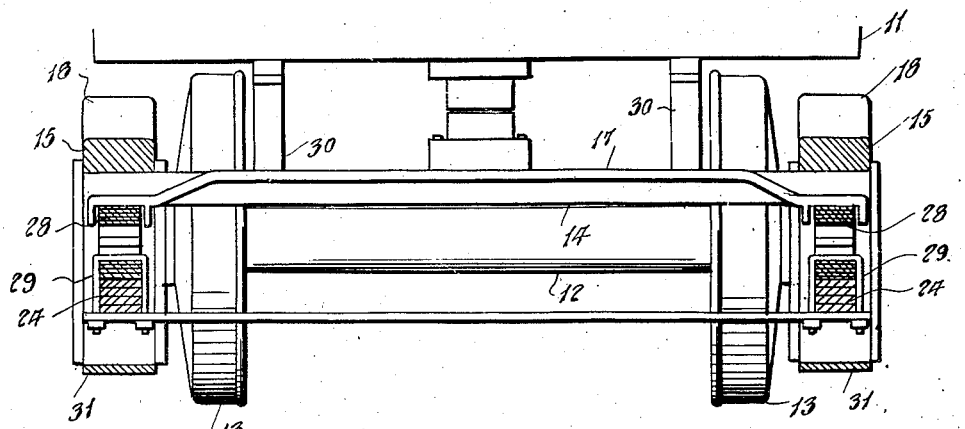
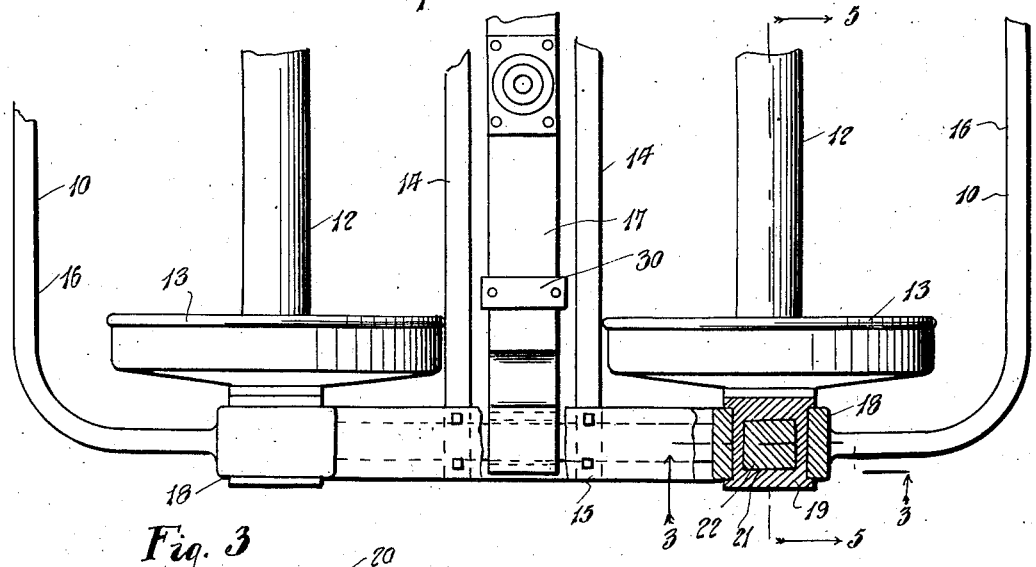
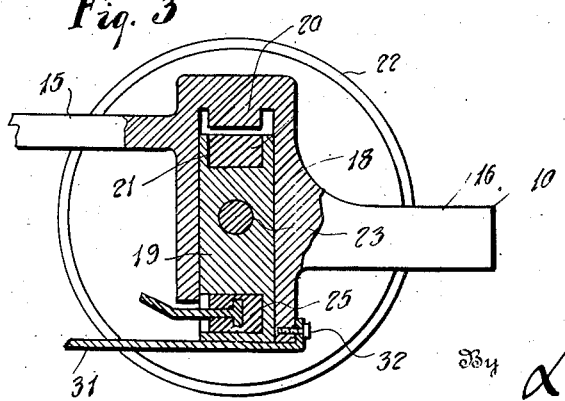
Inventor
W. C. Klein.

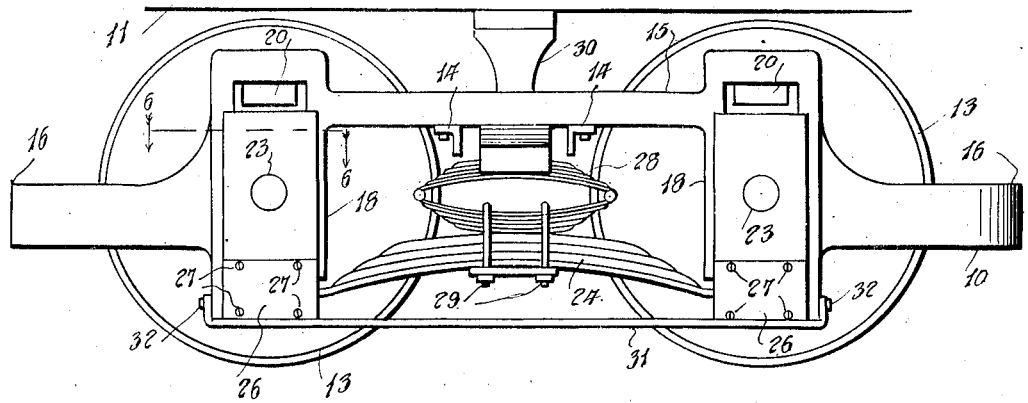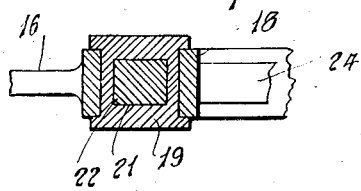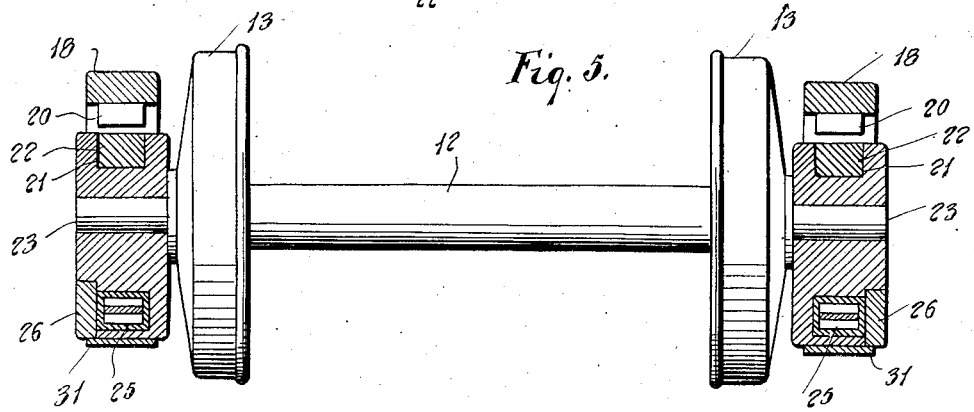

Patented Aug. 30, 1932

1,874,761

UNITED STATES PATENT OFFICE

WILLIAM C. KLEIN, OF ALLENTOWN, PENNSYLVANIA

RAILWAY CAR TRUCK ASSEMBLY

Application filed January 14, 1931. Serial No. 508,783.

This invention relates to a truck assembly primarily for railway cars.

The prime object of the invention is to provide such a structure wherein the car body is supported on the axle and thus without being supported on the truck frame particularly so that the car body will not be affected by variations in load thereon which possesses the material advantage over existing structures, of allowing the brake shoes to remain in one relation to the wheels, rather than moving with the load and altering the brake adjustment. Such a structure has the further advantage of carrying motors or other equipment without subjection to undue vibration and of preventing shocks from the wheels traveling to the car body.

It is further aimed to provide such a structure in which the ends of the springs employed are preferably rubber-mounted.

Another object is to provide a novel construction wherein the frame of the truck performs the function of positioning and locating the wheels and axles.

Various additional objects and advantages will become apparent from a consideration of the description following taken in connection with accompanying drawings illustrating an operative embodiment.

In said drawings:—

Figure 1 is a fragmentary plan view of a car truck embodying the invention,

Figure 2 is a central transverse sectional view through such a truck,

Figure 3 is a sectional view taken on the line 3—3 of Figure 1,

Figure 4 is a side elevation of the truck,

Figure 5 is a sectional view taken on the line 5—5 of Figure 1, and

Figure 6 is a sectional view taken on the line 6—6 of Figure 4.

Referring specifically to the drawings, 10 designates a truck frame and it is to be understood that the usual number thereof are used in connection with a car body fragmentarily suggested at 11. Each truck frame has two axles 12 associated therewith and each of which is provided with a wheel 13 adapted for travel on rails as usual. The truck frames 10 may be of any suitable construction according to the invention and as shown embody transoms 14 connected to side frames 15, in turn connected to end frames 16. A bolster 17 upon which the car body 11 is supported, is disposed between the transoms 14 for vertical movement independently of the frame 10.

The side members 15 are equipped with pedestals 18 in which pedestal boxes 19 are disposed, having flanges 20 which overlap the adjacent portions of the pedestals 18. Such pedestals have depending studs at 20 which enter recesses 21 in the top of the pedestal box and which may carry rubber blocks or springs 22 for cushioning engagement therewith. The extremities of the axles 12, designated 23, are connected to the pedestal box 19.

The bolster spring, which may be of any suitable type, for instance the semi-elliptical, are employed at 24 and the terminals thereof are connected to the pedestal boxes 19, preferably being anchored in rubber blocks 25 carried by such pedestal boxes. The blocks 25 are removable for replacement upon the removal of detachable plates 26, screwed or otherwise secured at 27 to the pedestal boxes. It is obvious that the springs 24 may be secured by shackles or in any other suitable manner to the pedestals, whereby the same will be anchored to the wheels and axles rather than to the truck 10.

The car body 11 may be supported in any suitable manner from the springs 24, for instance through the intermediary of elliptic springs 28, clamped at 29 to the springs 24, and in turn having the bolster 17 clamped thereto as at 30, and which bolster supports the car body 11.

A tie bar 31 is provided and connects the under sides of the pedestals 18 on each side of the truck, said tie bar being secured in position by means of bolts 32 or their equivalent.

The usual brake rigging of a railway car truck, is carried by the truck frame 10, and since it is of usual construction, illustration thereof has been omitted from the drawings for the sake of clearness.

As a result of the construction described, any variations in the load of the car body does not effect the movement of the truck frame, thereby permitting the brake shoes to remain in one relation to the wheels rather than lowering with the load and offering the brake adjustment as in existing constructions and in addition, motors or other equipment carried by the truck frames are not subject to variations or vibration. Further, shocks from the wheels do not travel to the car body due to the rubber mounting of the spring ends, together with the long elliptic spring, which will give easier riding.

Various changes may be resorted to provided they fall within the spirit and scope of the invention.

I claim as my invention:—

1. In car truck construction, a frame, pedestal boxes carried thereby, axles journaled in said boxes, wheels on said axles, a spring to support a body, and means rubber-mounting the terminals of said spring in said pedestal boxes.

2. In car truck construction, a frame, pedestal boxes carried thereby, axles journaled in said boxes, wheels on said axles, a spring to support a body, and means rubber-mounting the terminals of said spring in said pedestal boxes, said frame having pedestals receiving said pedestal boxes.

3. In car truck construction, a frame, pedestals carried thereby, axles journaled in said boxes, wheels on said axles, a spring to support a body, means rubber-mounting the terminals of said spring in said pedestal boxes, said frame having pedestals receiving said pedestal boxes, and inter-fitting connections between said pedestal boxes and pedestals adjacent the tops and flanges on the pedestal boxes overlapping the pedestals.

4. A car truck construction having a frame provided with pedestals, pedestal boxes disposed in the pedestals, axles mounted by the pedestal boxes, wheels carried by the axles, said pedestal boxes extending below portions of the pedestals, load-sustaining spring means extending under said portions and connected to the pedestal boxes, said pedestal boxes having recesses receiving the spring means, and displaceable closure means for said recesses at the sides of the pedestal boxes.

In testimony whereof I affix my signature.

WILLIAM C. KLEIN.